(12) United States Patent
Zhou et al.

(10) Patent No.: US 8,011,815 B2
(45) Date of Patent: Sep. 6, 2011

(54) LIGHT SOURCE DEVICE HAVING HEAT DISSIPATION MODULE

(75) Inventors: Zhi-Yong Zhou, Shenzhen (CN); Qiao-Li Ding, Shenzhen (CN); Hai-Bing Cao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 376 days.

(21) Appl. No.: 12/277,239

(22) Filed: Nov. 24, 2008

(65) Prior Publication Data
US 2010/0128482 A1 May 27, 2010

(51) Int. Cl.
*F21V 29/00* (2006.01)
(52) U.S. Cl. ......... 362/373; 362/218; 362/800; 165/33; 165/104
(58) Field of Classification Search .................. 362/294, 362/218, 264, 345, 373, 547, 800; 165/104.33; 361/695, 697
See application file for complete search history.

(56) References Cited

U.S. PATENT DOCUMENTS

| | | | | |
|---|---|---|---|---|
| 4,815,290 A * | 3/1989 | Dunstan | ......... | 60/517 |
| 5,927,094 A * | 7/1999 | Nickum | ......... | 62/259.2 |
| 7,013,639 B2 * | 3/2006 | Hamman | ......... | 60/508 |
| 7,494,248 B2 * | 2/2009 | Li | ......... | 362/294 |
| 7,556,406 B2 * | 7/2009 | Petroski et al. | ......... | 362/294 |
| 7,699,501 B2 * | 4/2010 | Liu | ......... | 362/294 |
| 2005/0078447 A1 * | 4/2005 | Hamann et al. | ......... | 361/689 |
| 2007/0144710 A1 * | 6/2007 | Cheng | ......... | 165/104.33 |
| 2007/0217153 A1 * | 9/2007 | Lai et al. | ......... | 361/700 |
| 2009/0266522 A1 * | 10/2009 | Lin et al. | ......... | 165/104.33 |
| 2010/0027276 A1 * | 2/2010 | Kornitz et al. | ......... | 362/373 |

* cited by examiner

*Primary Examiner* — James Lee
*Assistant Examiner* — Stanley Weinberg
(74) *Attorney, Agent, or Firm* — Altis Law Group, Inc.

(57) ABSTRACT

A light source device includes a first heat dissipation structure, an LED module, a heat energy convertor and a fan. The first heat dissipation structure includes a heat dissipation base, a first fin group attached on a top surface of the heat dissipation base. The LED module is attached on a bottom surface of the heat dissipation base of the first heat dissipation structure. The heat energy convertor is thermally connected to the heat dissipation base of the first heat dissipation structure through heat pipes, and configured for changing heat energy generated by the LED module into kinetic energy. The fan is disposed over the first fin group and driven by the heat energy convertor.

12 Claims, 4 Drawing Sheets

LIGHT SOURCE DEVICE HAVING HEAT DISSIPATION MODULE

BACKGROUND OF THE INVENTION

1. Field of the Invention

The present invention relates to light source devices and, particularly, to a light source device having a heat dissipation module.

2. Description of Related Art

Recently, light emitting diodes (LEDs) are widely used in light source devices due to their high brightness, long lifespan, and wide color gamut. Generally, a light source device includes a number of LEDs, and most of the LEDs are driven at the same time, which results in a rapid accumulation of heat. Due to the rapid accumulation of heat, a temperature of the light source device rises quickly, and therefore an operation of the LEDs in the light source device may be instable.

In order to quickly dissipate the rapid accumulation of heat, heat sinks are integrated into the light source device. A typical heat sink includes a base contacting the LEDs to absorb heat therefrom and a number of parallel planar fins soldered or adhered to the base. The fins dissipate the heat into ambient atmosphere.

By merely depending on natural convention to dissipate the heat of the LEDs, the heat sink must be very bulk and heavy, which adversely limits the applications of the light source device. To use an electrical fan to generate a forced airflow through the fins of the heat sink is not reliable, since when the light source device is used in a severe condition, such as in a highway, the electrical connection between the fan and the power source is easily to be damaged. Finally, the mere dissipation of the heat generated by the LEDs into the ambient air causes a waste of the heat energy.

What is needed, therefore, is a light source device having a heat dissipation module capable of recycling the dissipated heat which can overcome the above-described problems.

SUMMARY OF THE INVENTION

An exemplary embodiment of a light source device includes an LED module, a first heat dissipation structure, a second heat dissipation structure, at least one heat pipe, a heat energy convertor and at least a fan. The first heat dissipation structure includes a heat dissipation base, a first fin group attached on a top surface of the heat dissipation base. The LED module is attached on a bottom surface of the heat dissipation base of the first heat dissipation structure. The heat energy convertor is thermally connected to the heat dissipation base of the first heat dissipation structure through the at least one heat pipe, and configured for changing heat energy generated by the LED module into kinetic energy. The fan is disposed over the first fin group and driven by the heat energy convertor. The second heat dissipation structure is configured for dissipating heat of the heat energy convertor.

Advantages and novel features will become more apparent from the following detailed description when taken in conjunction with the accompanying drawings.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION OF THE INVENTION

An embodiment will now be described in detail below and with reference to the drawings.

Figure 1:
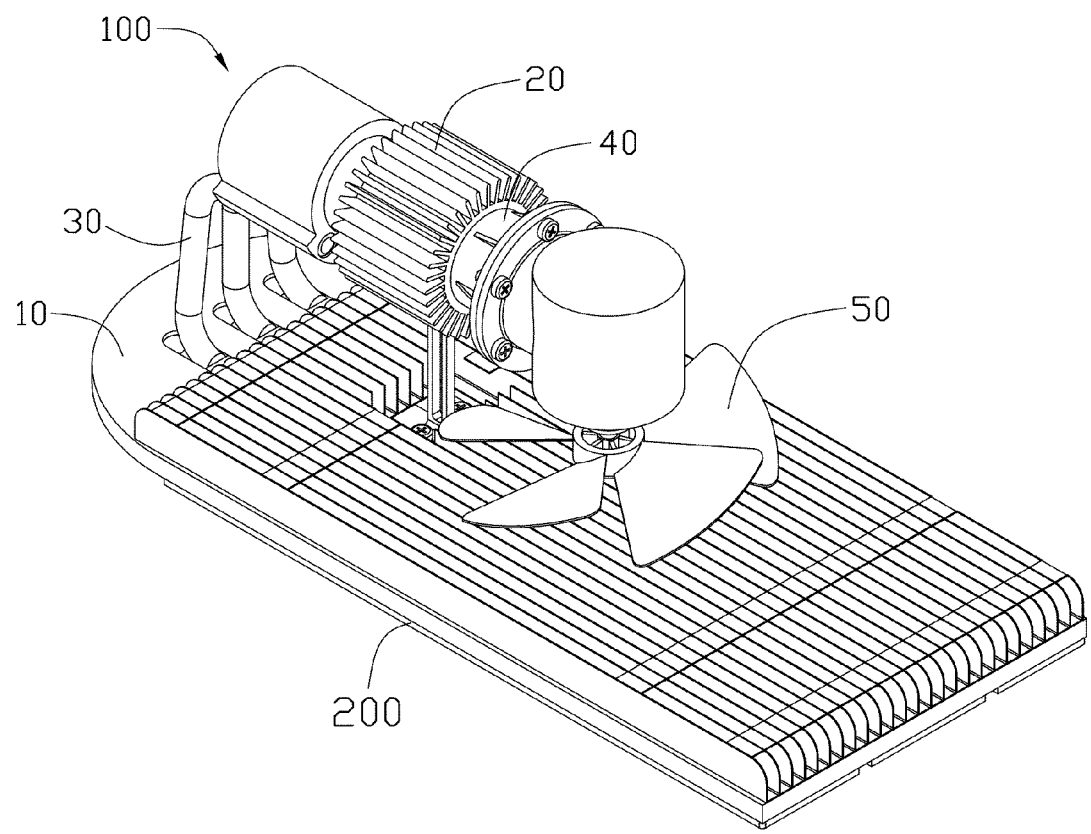
FIG. 1 is an assembled view of a light source device in accordance with an exemplary embodiment of the present disclosure.

Referring to FIG. 1, an exemplary embodiment of a light source device is shown. The light source device includes a heat dissipation module 100 and an LED module 200. The heat dissipation module 100 includes a first heat dissipation structure 10, a second heat dissipation structure 20, at least a heat pipe 30, a heat energy convertor 40 and at least a fan 50. In the present embodiment, three heat pipes 31 and one fan 50 are arranged in the heat dissipation module 100.

Figure 2:
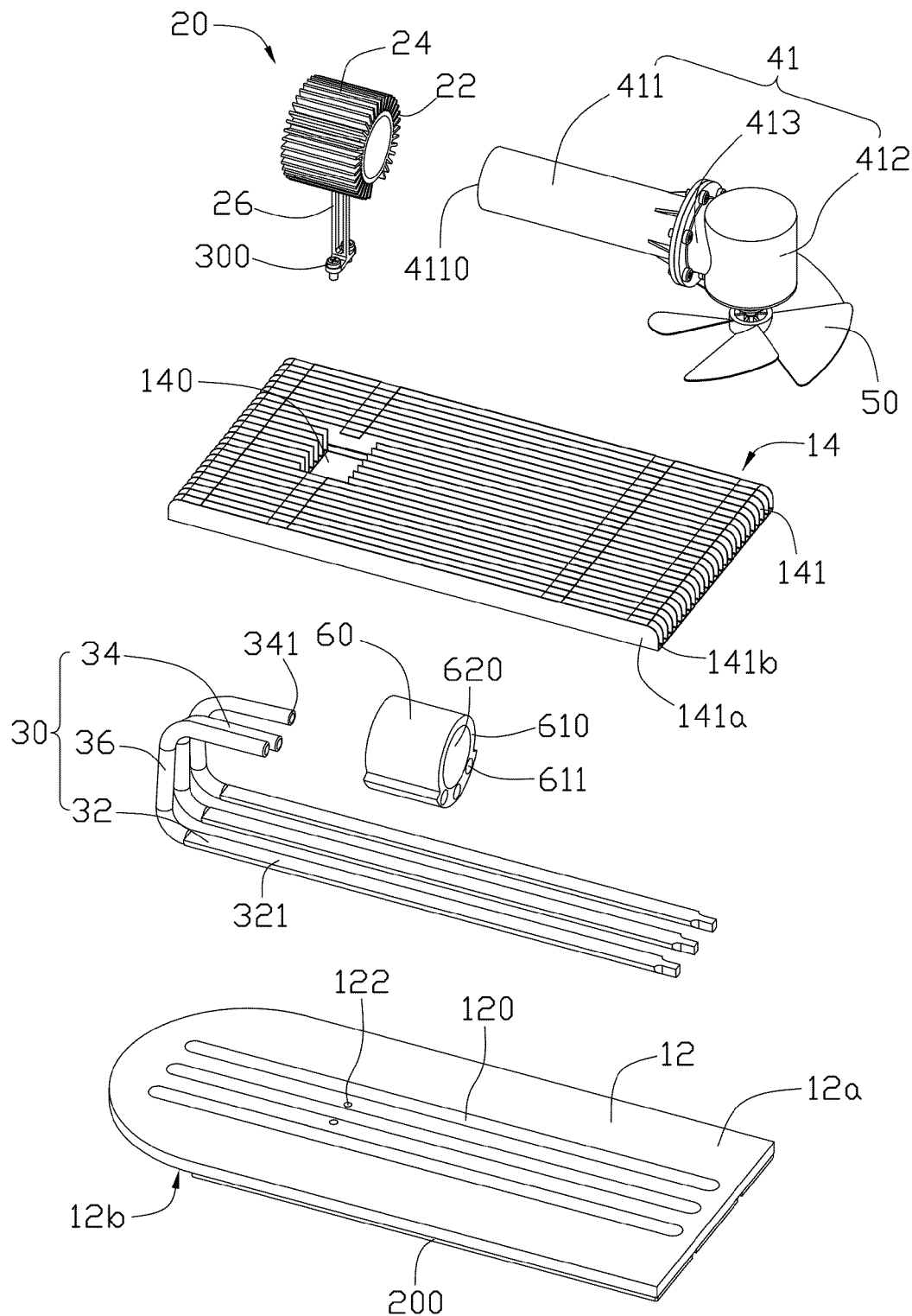
FIG. 2 is an isometric, exploded view of the light source device of FIG. 1.
Figure 3:
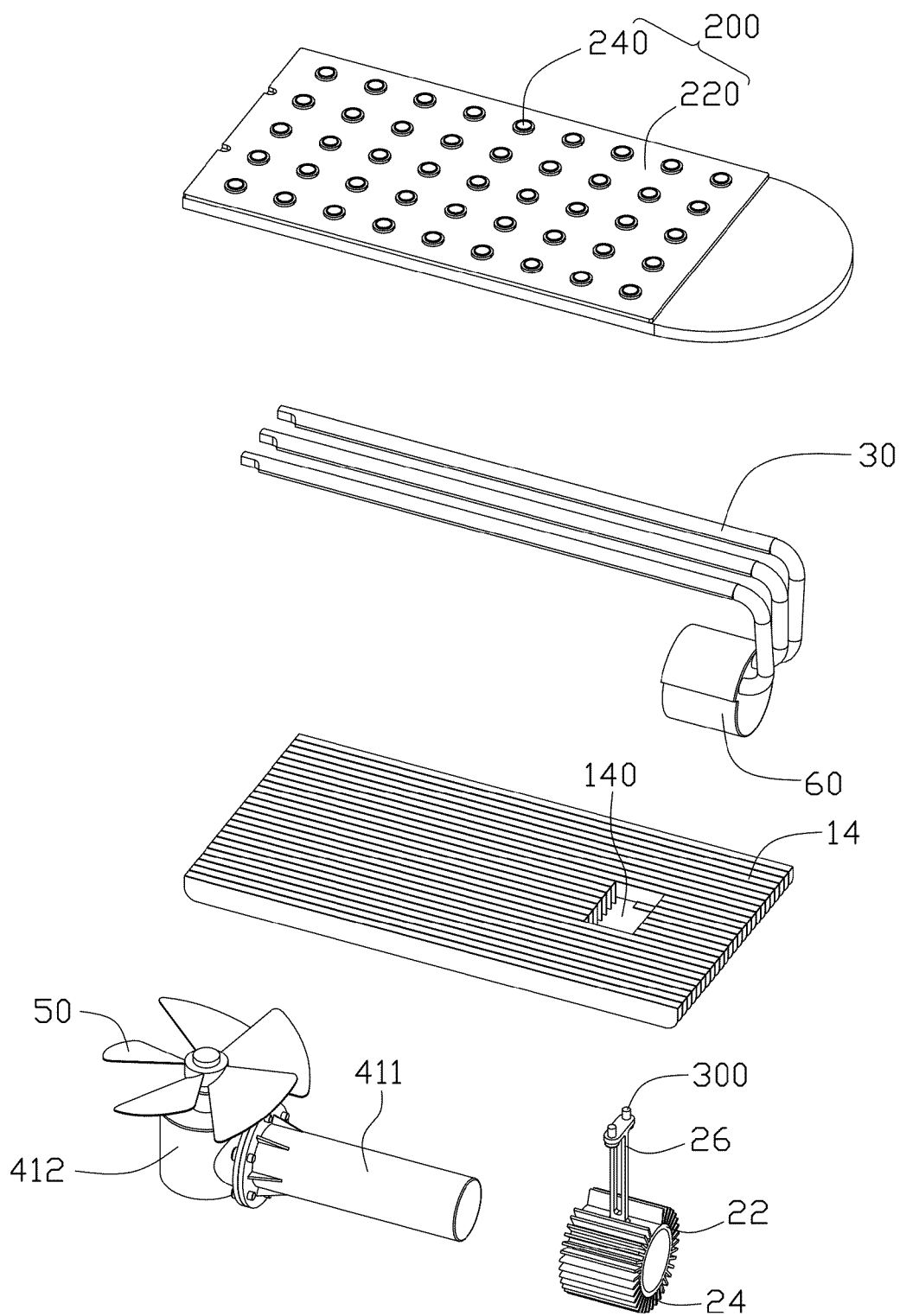
FIG. 3 is an inverted view of FIG. 2.

Referring to FIG. 2 and FIG. 3, the first heat dissipation structure 10 includes a rectangular heat dissipation base 12, and a first fin group 14 attached to a top surface 12a of the heat dissipation base 12. The LED module 200 is attached to a bottom surface 12b of the heat dissipation base 12. The LED module 200 includes a printed circuit board 220 and a plurality of LEDs 240 arranged in an array and mounted on a bottom surface of the printed circuit board 220. Three straight grooves 120 for respectively receiving evaporators 32 of the three heat pipes 30 are defined in the central portion of the top surface 12a, and spaced from each other. The three straight grooves 120 extend in a lengthwise direction of the heat dissipation base 12, and are parallel with each other. Two securing holes 122 are defined in the heat dissipation base 12 at locations beside the middle straight groove 120 to allow two fasteners 300 to secure therein to thereby fix the second heat dissipation structure 20 on the top surface 12a of the heat dissipation base 12. In the preferred embodiment, the fasteners 300 are bolts.

Each of the three heat pipes 30 includes the evaporator 32, a condenser 34 and a connection section 36 interconnecting the evaporator and condenser 32, 34. A length of the evaporator 32 is longer than that of the condenser 34. The evaporator 32 is received in a corresponding straight groove 120, and has a planar top surface 321 coplanar with the top surface 12a of the heat dissipation base 12. The planar top surfaces 321 of the evaporators 32 of the heat pipes 30 and the top surface 12a cooperatively define a flat top surface to support the first fin group 14 thereon.

The first fin group 14 defines an opening 140 corresponding to a position of the two securing holes 122 to allow a bracket 26 (which will be more detailedly disclosed herebelow) of the second heat dissipation structure 20 passing therethrough to fix the second heat dissipation structure 20 on the top surface 12a of the heat dissipation base 12. The first fin group 14 includes a number of L-shaped first fins 141. Each of the first fins 141 has a sidewall 141a and a flange 141b perpendicularly bent from a bottom end of the side wall 141a. The first fins 141 are parallel with each other and stacked together. The flanges 141b ensure that a distance maintained between adjacent first fins 141. The flanges 141b of all first fins 141 cooperatively define a flat bottom surface which is soldered to the flat top surface defined by the planar top surfaces 321 of the evaporators 32 of the heat pipes 30 and the top surface 12a. Therefore, the flat bottom surface of the first fins 141 is thermally and mechanically attached to the top surfaces 321 and top surface 12a.

The condenser 34 has a free end 341 thermally connected to the heat energy convertor 40 directly or through a connection element. In this embodiment, the connection element is a cylinder-shaped heat absorbing element 60. The heat absorbing element 60 has a cylinder-shaped wall 610 with a first through hole 620 defined in a center thereof. The cylinder-shaped wall 610 is horizontally arranged over the first fin group 14, and has a lower portion near the first fin group 14. Three parallel second through holes 611 are longitudinally defined in the lower portion of the heat absorbing element 60. The three second through holes 611 are configured for respectively receiving the condensers 34 of the three heat pipes 30 therein. The first through hole 620 is configured for receiving a corresponding part of the heat energy convertor 40 therein. In this manner, the heat energy convertor 40 is thermally connected to the first heat dissipation structure 10 through the three heat pipes 30.

Figure 4:
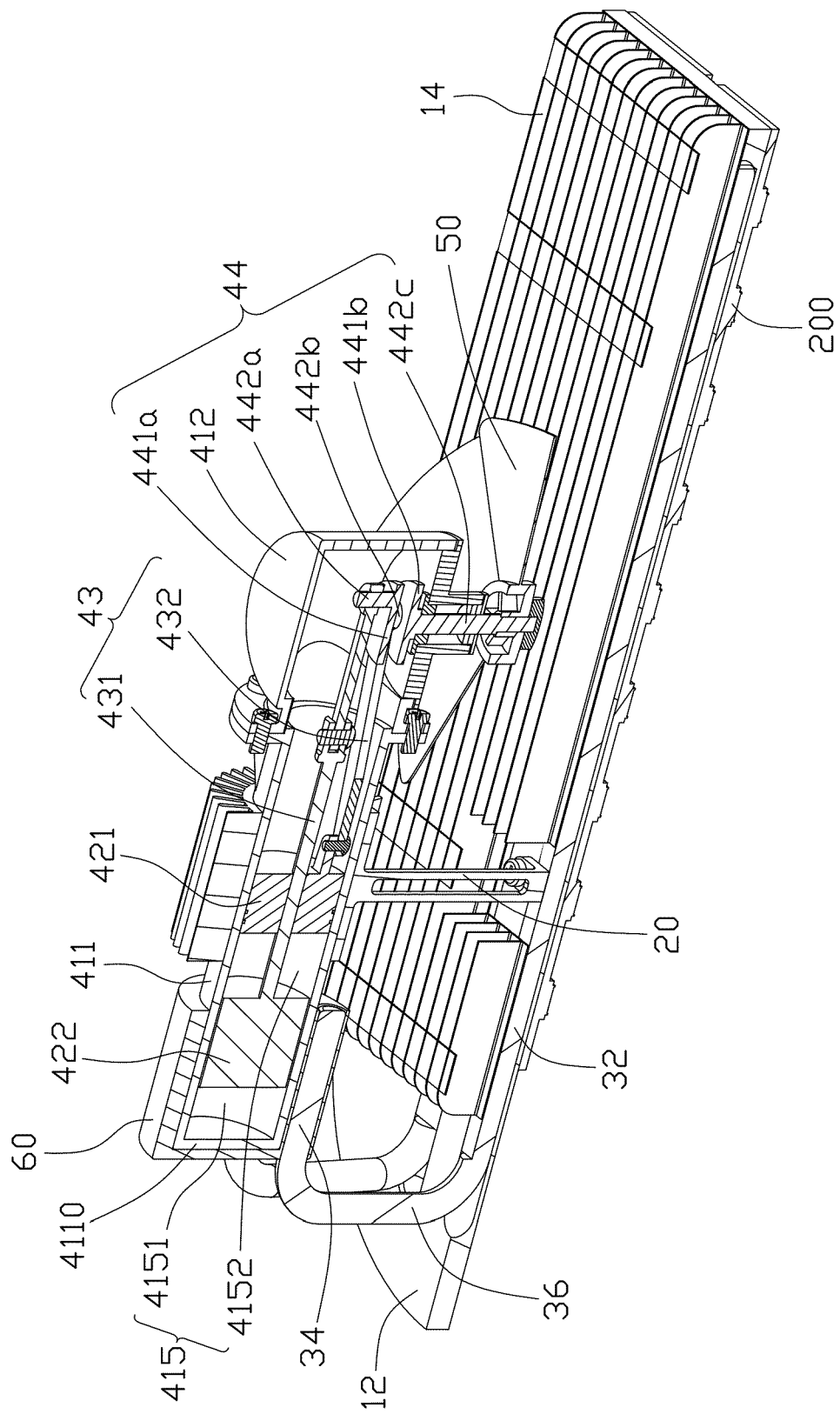
FIG. 4 is a cross sectional view of FIG. 1.

Referring to FIG. 2 and FIG. 4, the heat energy convertor 40 includes a shell 41 and a first piston 421, a second piston 422, a crank-connecting rod group 43 and a crankshaft-flywheel group 44 arranged in the shell 41. The shell 41 includes a cylinder-shaped main body portion 411 for containing the first and second pistons 421, 422, a cylinder-shaped head portion 412 for containing the crankshaft-flywheel group 44, and a joint element 413 for connecting the main body portion 411 and the head portion 412 together. A heat absorbing end 4110 of the main body portion 411 is received in the first through hole 620 of the heat absorbing element 60. An axis of the main body portion 411 is perpendicular to an axis of the head portion 412. In this manner, the main body portion 411 is parallel with the first fin group 14, and the head portion 412 is perpendicular to the first fin group 14.

The first piston 421 is column-shaped and received in a middle position of the main body portion 411. An external wall of the first piston 421 slideably contacts with an internal wall of the main body portion 411, whereby the first piston 421 can move in the main body portion 411 when a force is applied thereon. A sealed chamber 415 is formed between the heat absorbing end 4110 of the main body portion 411 and the first piston 421, and a working gas (e.g., air) is provided in the sealed chamber 415. The second piston 422 is column-shaped and arranged in a middle position of the sealed chamber 415. As a result, the sealed chamber 415 is divided into a heat absorbing chamber 4151 and a heat dissipating chamber 4152 along a left-to-right direction as illustrated in FIG. 4. Like the first piston 421, an external wall of the second piston 422 slideably contacts with the internal wall of the main body portion 411, whereby the second piston 422 can move in the sealed chamber 415 of the main body portion 411.

The crank-connecting rod group 43 is configured for converting straight-line reciprocating motions of the first and second pistons 421, 422 into a rotation of the crankshaft-flywheel group 44. The crank-connecting rod group 43 includes a first crank-connecting rod 431 and a second crank-connecting rod 432. The crankshaft-flywheel group 44 has an integral configuration, and includes an upper flywheel 441a, a lower flywheel 441b, a first crankshaft 442a, a second crankshaft 442b and a third crankshaft 442c. The first crankshaft 442a perpendicularly and upwardly extends from the upper flywheel 441a. The second crankshaft 442b is perpendicularly interconnected between the first and second flywheels 441a, 441b. The first crankshaft 442a is eccentrically arranged on the upper flywheel 411a and horizontally offset a distance in relation to the second crankshaft 442b. The first and second crankshafts 442a, 442b each are offset a horizontal distance from the third crankshaft 442c. The first and second flywheels 441a, 441b and the third crankshaft 442c are concentric. The second crankshaft 442b eccentrically interconnects the first and second flywheels 441a, 441b. As a result, the upper and lower flywheels 441a, 441b can rotate around the third crankshaft 442c. The third crankshaft 442c perpendicularly and downwardly extends from a center of the second flywheel 441b. The fan 50 is fixed on a free end of the third crankshaft 442c, and therefore can rotate together with the third crankshaft 442c.

A through hole (not labeled) is defined in the first piston 421 along an axis thereof to allow the first crank-connecting rod 431 passing therethrough to connect the second piston 422. An end of the first crank-connecting rod 431 is connected to the second piston 422, and the other end is connected to the first crankshaft 442a. An end of the second crank-connecting rod 432 is connected to the first piston 421, the other end is connected to the second crankshaft 442b.

The crankshaft-flywheel group 44 is arranged on a bottom inside of the head portion 412 of the shell 41. A through hole (not labeled) is defined in the bottom of the head portion 412 to allow the third crankshaft 442c passing therethrough to connect to the fan 50. The third crankshaft 442c is perpendicular to the first fin group 14, and the fan 50 is horizontally fixed over the first fin group 14.

The second heat dissipation structure 20 includes a heat dissipation barrel 22, a number of second fins 24 outwardly extending from an outside surface of the heat dissipation barrel 22, and the bracket 26 downwardly extending from a lower portion of the heat dissipation barrel 22. The heat dissipation barrel 22 is sleeved on an external surface of the main body portion 411 of the shell 41, and located at a position corresponding to the first piston 421 and the heat dissipation chamber 4152. That is, the first piston 421 and the heat dissipation chamber 4152 are surrounded by the heat dissipation barrel 22 to efficiently dissipate the heat. The bracket 26 extends through the opening 140 defined in the first fin group 14 and is fixed on the top surface 12a of the heat dissipation base 12 by the two bolts 300 respectively being screwed in two securing holes 122. Thus, the second heat dissipation structure 20 and the heat energy convertor 40 are fixed over the first fin group 14 through the bracket 26.

An operation of the light source device is detailed in the following. In a first stage, the heat generated by the LED module 200 is absorbed by the heat dissipation base 12, and transferred to the heat absorbing element 60 through the three heat pipes 30. The heat absorbed by the heat absorbing element 60 is transferred to the heat absorbing end 4110 of the main body portion 411, and therefore the working gas in the heat absorbing chamber 4151 is heated to expand. Thus, a pressure of the working gas rises and drives the second piston 422 to move right to the first piston 421. The first crank-connecting rod 431 connected to the second piston 422 is forced to push the first crankshaft 442a.

In a second stage, with the moving of the second piston 422, the heated working gas in the heat absorbing chamber 4151 enters into the heat dissipating chamber 4152; thus, pressure and temperature of the working gas in heat dissipating chamber 4152 rise. Then the working gas in heat dissipating chamber 4152 drives the first piston 421 to move right away from the second piston 422. Therefore, the second crank-connecting rod 432 connected to the first piston 421 is forced to push the second crankshaft 442b. Due to the pushing of the first and second crank-connecting rods 431, 432, the crankshaft-flywheel group 44 is forced to rotate, thereby driving the fan 50 to rotate.

In a third stage, the heat in the heat dissipating chamber 4152 is dissipated by the second heat dissipation structure 20, and then the first piston 421 will stop moving at a right dead point, while the crankshaft-flywheel group 44 rotates continuously due to its inertial characteristics. Thus, the first piston 421 is driven to move left to the second piston 422, and the working gas in the heat dissipating chamber 4152 is compressed to generate heat, whereby the temperature and pressure thereof rise. Then the second piston 422 is driven by the compressed working gas in the heat dissipating chamber 4152 to move left away from the first piston 421. Due to the continuous straight-line reciprocating motions of the first and second pistons 421, 422, the first and second crank-connecting rods 431, 432 respectively drive the first and second crankshafts 442a, 442b to rotate continuously.

The above-described first, second and third stages are performed repeatedly, the crankshaft-flywheel group 44 is driven to rotate continuously. Thus, the fan 50 is driven by the third crankshaft 442c of the crankshaft-flywheel group 44 to rotate continuously. Regarding the light source device, in one aspect, the heat generated by the LED module 200 is dissipated by the combination of the first fin group 14 and the fan 50. In another aspect, the heat generated by the LED module 200 is transferred to the heat energy convertor 40 and utilized by the heat energy convertor 40 to drive the fan 50 to rotate, thereby promoting the heat dissipation of the first fin group 14. Thus, the heat generated by the heat LED module 200 is dissipated, and the dissipated heat is recycled. In addition, due to the dissipated heat is efficiently used, the temperature of the surrounding environment of the light source device can not raise, whereby a damage of the light source device or a shortened lifespan thereof are prevented.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light source device comprising:
    a first heat dissipation structure comprising a heat dissipation base, a first fin group attached on a top surface of the heat dissipation base;
    an LED module attached on a bottom surface of the heat dissipation base of the first heat dissipation structure;
    a heat energy convertor thermally connected to the heat dissipation base of the first heat dissipation structure through at least one heat pipe, and configured for changing heat energy generated by the LED module into kinetic energy; and
    a fan disposed over the first fin group and driven by the heat energy convertor;
    wherein the at least one heat pipe comprises an evaporator embedded in the heat dissipation base, a condenser thermally connecting with the heat energy converter through a heat absorbing element and a connection section connected between the evaporator and condenser, the heat absorbing element comprising a cylinder-shaped wall, a first through hole surrounded by the cylinder-shaped wall, and at least one second through hole longitudinally defined in the cylinder-shaped wall, the condenser of the at least one heat pipe being received in the at least one second through hole, the heat energy convertor comprising a shell having a main body portion and a head portion connected to the main body portion, a heat absorbing end of the main body portion being received in the first through hole of the heat absorbing element.

2. The light source device as claimed in claim 1, wherein the evaporator of the at least one heat pipe is received in at least one groove defined in the top surface of the heat dissipation base of the first heat dissipation structure.

3. The light source device as claimed in claim 2, wherein the evaporator of the at least one heat pipe has a planar top surface coplanar with the top surface of the dissipation base, thereby cooperatively defining a flat top surface to support the first fin group thereon.

4. The light source device as claimed in claim 1, wherein the heat energy convertor further comprises:
    a first piston movably disposed in the main body portion, the first piston and the heat absorbing end cooperatively defining a sealed chamber;
    a second piston movably disposed in the sealed chamber to separate the sealed chamber into a heat absorbing chamber and a heat dissipating chamber;
    a crankshaft-flywheel group contained in the head portion and connected to the fan; and
    a crank-connecting rod group configured for converting straight-line reciprocating motions of the first and second pistons into a rotation of the crankshaft-flywheel group.

5. The light source device as claimed in claim 4, wherein the crankshaft-flywheel group comprises an upper flywheel, a lower flywheel, a first crankshaft upwardly and eccentrically extending from the upper flywheel, a second crankshaft perpendicularly and eccentrically interconnected between the first and second flywheels and a third crankshaft downwardly extending from the second flywheel and connecting to the fan, the first crankshaft is horizontally offset a distance in relation to the second crankshaft, the second crankshaft is horizontally offset a distance in relation to the third crankshaft, the third crankshaft and the upper and lower flywheels are concentric.

6. The light source device as claimed in claim 5, wherein the crank-connecting rod group comprises a first crank-connecting rod and a second crank-connecting rod, an end of the first crank-connecting rod is connected to the second piston, and the other end of the first crank-connecting rod is connected to the first crankshaft, an end of the second crank-connecting rod is connected to the first piston, and the other end of the second crank-connecting rod is connected to the second crankshaft.

7. The light source device as claimed in claim 6, wherein a through hole is defined in the first piston along an axis thereof to allow the first crank-connecting rod to extend therethrough to connect the second piston.

8. The light source device as claimed in claim 1, further comprising a second heat dissipation structure having a heat dissipation barrel sleeved on an external surface of the main body portion of the shell, and a plurality of second fins outwardly extending from an outside surface of the heat dissipation barrel.

9. The light source device as claimed in claim 8, wherein the second heat dissipation structure additionally comprises a bracket downwardly extending from a lower portion of the heat dissipation barrel to support the second heat dissipation structure and the shell over the first fin group.

10. The light source device as claimed in claim 9, wherein the first fin group defines an opening to allow the bracket to extend therethrough to be securely fixed on the top surface of the dissipation base of the first heat dissipation structure.

11. A light source device comprising:
    a heat dissipation base;

an LED module attached on a bottom surface of the heat dissipation base;
a heat energy convertor thermally connected to a top surface of the heat dissipation base for changing heat energy generated by the LED module into kinetic energy; and
a fan driven by the heat energy convertor to dissipate heat generated by the LED module;
wherein the heat energy convertor comprises:
a shell having a main body portion and a head portion connected to the main body portion, a heat absorbing end of the main body portion being thermally connected to the top surface of the heat dissipation base;
a first piston slideably disposed in the main body portion, the first piston and the heat absorbing end cooperatively defining a sealed chamber;
a second piston slideably disposed in the sealed chamber to separate the sealed chamber into a heat absorbing chamber and a heat dissipating chamber;
a crankshaft-flywheel group contained in the head portion and connected to the fan; and
a crank-connecting rod group configured for converting straight-line reciprocating motions of the first and second pistons into a rotation of the crankshaft-flywheel group, the crankshaft-flywheel group comprising an upper flywheel, a lower flywheel, a first crankshaft eccentrically and upwardly extending from the upper flywheel, a second crankshaft eccentrically and perpendicularly interconnected between the first and second flywheels and a third crankshaft downwardly extending from the second flywheel and connecting to the fan, the third crankshaft and the upper and lower flywheels being concentric.

12. The light source device as claimed in claim 11, wherein the crank-connecting rod group comprises a first crank-connecting rod and a second crank-connecting rod, an end of the first crank-connecting rod is connected to the second piston, and the other end of the first crank-connecting rod is connected to the first crankshaft, an end of the second crank-connecting rod is connected to the first piston, and the other end of the second crank-connecting rod is connected to the second crankshaft.

* * * * *